United States Patent [19]

Vetter

[11] Patent Number: 4,751,913

[45] Date of Patent: Jun. 21, 1988

[54] APPARATUS FOR HEATING WATER

[76] Inventor: Richard Vetter, Schmedenstedterstr. 9-9A, D-3150 Peine, Fed. Rep. of Germany

[21] Appl. No.: 106,909

[22] Filed: Oct. 8, 1987

Related U.S. Application Data

[63] Continuation of Ser. No. 845,935, Mar. 28, 1986, abandoned.

[30] Foreign Application Priority Data

Oct. 15, 1985 [DE] Fed. Rep. of Germany ....... 3536667

[51] Int. Cl.⁴ .................. F24H 1/00; F24D 9/00; F28F 7/00
[52] U.S. Cl. .................. 126/350 R; 126/101; 126/112; 165/144; 165/78; 122/20 B
[58] Field of Search .............. 126/350 R, 350 A, 101, 126/112; 122/20 A, 20 B, 169, 235 B, 239, 250 R, 23, 412; 165/78, 144

[56] References Cited

U.S. PATENT DOCUMENTS

| | | | |
|---|---|---|---|
| 1,312,118 | 8/1919 | Hough | 165/78 |
| 1,622,006 | 3/1927 | Seligman | 165/78 |
| 1,828,644 | 10/1931 | Chlapowski et al. | 165/144 |
| 1,994,026 | 3/1935 | Pierce | 122/20 B X |
| 2,013,186 | 9/1935 | Price | 165/144 X |
| 3,659,560 | 5/1972 | Carter | 126/350 R X |
| 4,386,652 | 6/1983 | Dragojevic | 165/144 |
| 4,541,410 | 9/1985 | Jatana | 122/20 B X |

FOREIGN PATENT DOCUMENTS 2499702 8/1982 France .................. 126/350 R

Primary Examiner—Randall L. Green
Attorney, Agent, or Firm—Becker & Becker, Inc.

[57] ABSTRACT

An apparatus for heating water, especially a hot-water boiler. The apparatus has a combustion chamber and two or more heat exchangers that are disposed one above the other. The heat exchanger disposed in the bottom of the apparatus is associated with a condensation chamber. In order to be able to operate this heat exchanger without water, and to be able to raise the efficiency of the apparatus as a whole, the heat exchanger of the condensation chamber is provided with a fresh air inlet and a fresh air outlet. Air is conveyed through this heat exchanger, whereupon it is heated up. This warmed air is supplied to the burner of the apparatus.

13 Claims, 2 Drawing Sheets

APPARATUS FOR HEATING WATER

This application is a continuation of application Ser. No. 845,935 filed Mar. 28, 1986, now abandoned.

BACKGROUND OF THE INVENTION

1. Field of the Invention

The present invention relates to an apparatus for heating water, and especially relates to a hot-water boiler. The apparatus has a chamber, especially a combustion chamber, that serves for the introduction or generation of hot gases. A heat exchanger is associated with this chamber, and one or more further heat exchangers are also provided. All of the heat exchangers are disposed one above the other within a housing of the apparatus. The aforementioned chamber or combustion chamber is disposed at the top of the apparatus, and a chamber disposed all the way at the bottom is embodied as a condensation chamber that is also provided with a heat exchanger.

2. Description of the Prior Art

Pursuant to heretofore known proposals (German Offenlegungsschrift No. 33 18 468), the heat exchanger that is associated with the condensation chamber has water flowing therethrough. Accordingly, at least two different circulations result for the heating of water, in particular taking into consideration the heat exchanger disposed above the condensation chamber. However, in many applications two circulations are not necessary, and in addition require special measures.

An object of the present invention is to be able to operate with only a single circulation, i.e. one water inlet and one water outlet, yet to be able to be in a position to operate the aforementioned condensation chamber.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
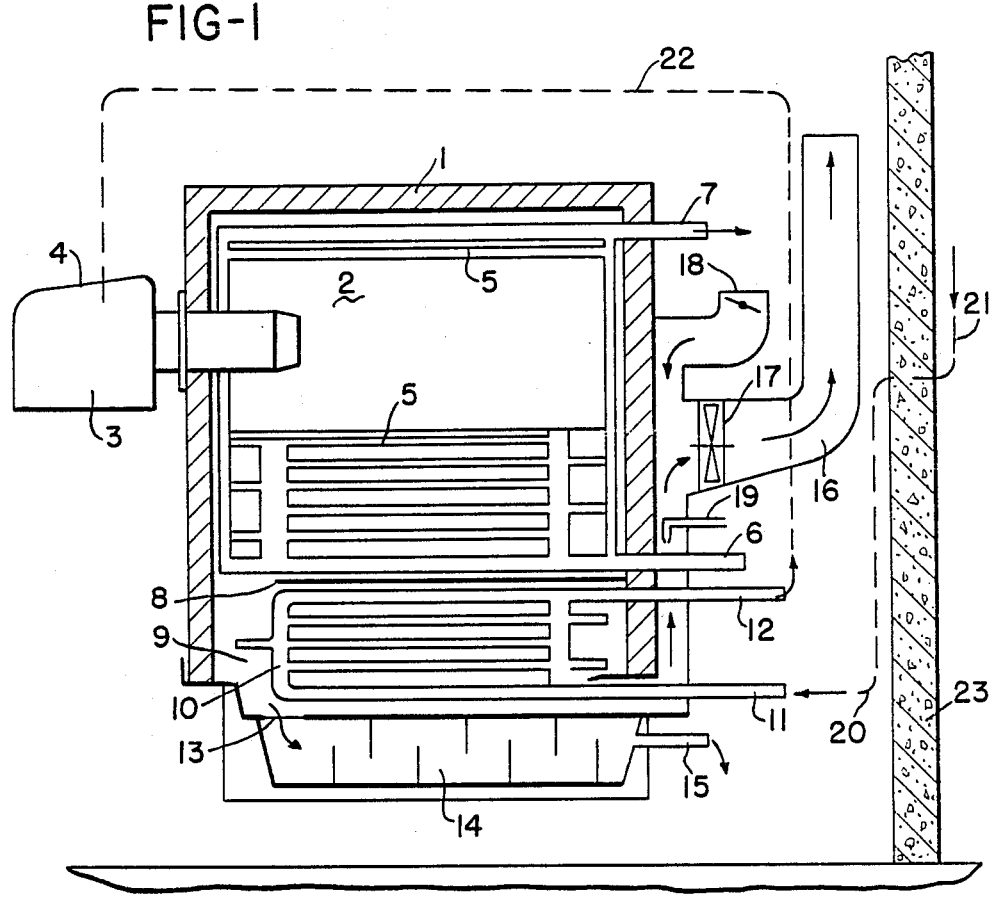
FIG. 1 is a vertical cross-sectional view through one exemplary embodiment of a hot-water boiler pursuant to the present invention.

In the apparatus of the present invention, the heat exchanger that is associated with the condensation chamber is provided with a fresh air inlet and a fresh air outlet, with the latter being provided with a line that leads to the burner of the combustion chamber.

Advantageously connected ahead of the fresh air inlet is a line via which fresh air can be supplied from the atmosphere to the heat exchanger and hence to the burner. The inventive apparatus is preferably embodied in such a way that all of the air that is to be supplied to the burner is conveyed, or can be conveyed, through the heat exchanger.

The inventively embodied apparatus has the advantage that a second circulation can be dispensed with entirely, and additional installations for a water circulation are unnecessary. In addition, the efficiency is improved due to preheating of the combustion air and the supply thereof via the heat exchanger of the condensation chamber. A better combustion is achieved; furthermore, it is generally advisable not to supply the combustion air from the heating chamber, which in the present situation can be readily achieved. Finally, the technical outlay for supplying air is considerably less than the outlay for the water circulation.

It is furthermore expedient if the heat exchanger that serves for conveying the burner air has relatively large cross-sectional passages for the combustion air. In addition, the heat exchanger must be able to cope with the corrosive action of the condensate. Moreover, the spatial dimensions of the heat exchangers must be kept within permissible narrow limits. Consequently, the present invention strives to provide a heat exchanger that to a large extent satisfies these requirements.

To resolve this task, the present invention provides for a plurality of air channels that are disposed one above the other on each side of the heat exchanger. A channel from one side is connected with a channel on the other side of the heat exchanger by a plurality of transversely extending channels. The former superimposed channels on the sides of the heat exchanger alternately communicate with one another via openings. Furthermore, the combustion gases are passed back and forth through the heat exchanger in the direction of those channels disposed at the sides of the heat exchanger. These combustion gases are passed between the transversely extending channels, hereinafter called transverse channels, which are disposed one above the other.

The heat exchanger of the present invention permits a particularly large cross-sectional passage for the combustion air and the exhaust gases. In addition, the inventive heat exchanger can be assembled by joining together individual components. The inventive heat exchanger can even be composed of thin-walled individual components that are deep-drawn or formed in some other manner.

Further specific features of the present invention will be described in detail subsequently.

DESCRIPTION OF PREFERRED EMBODIMENTS

Referring now to the drawings in detail, a combustion chamber 2 is disposed within the box-like housing 1, which, in a customary manner, is provided with insulated walls. Associated with the combustion chamber 2 is a burner 3, for example a gas or oil burner, to which intake or fresh air is supplied via a connection 4.

Associated with the combustion chamber 2 is a heat exchanger 5, which at the bottom has an inlet 6, and at the top has an outlet 7. The heat exchanger 5 partially surrounds the combustion chamber 2, but also extends further downwardly into the housing 1. The space surrounded by the heat exchanger 5 is closed off at the bottom, for example via an insulating plate 8, in order in this manner to provide a condensation chamber 9 in the lower portion of the housing for the exhaust gases. A separate heat exchanger 10 is associated with the condensation chamber 9. This heat exchanger 10 has an inlet 11 for intake or fresh air, and, disposed above the inlet 11, an outlet 12 for heated fresh air.

The condensate that collects in the condensation chamber 9 passes via the outlet 13 into a chamber 14 disposed below the housing 1; decontamination or the like can take place in the chamber 14. The discharge or drain is designated by the reference numeral 15.

The exhaust gases obtained from the condensation chamber 9 pass into the atmosphere via an exhaust gas conduit 16. Disposed within this conduit is a fan 17 in order to be able to control the velocity of the exhaust gas. Intake or fresh air can be supplied to the exhaust gas conduit 16 via a feed pipe 18. It is also possible to dispose a water sprayer 19 within the exhaust gas conduit 16.

The fresh air is supplied via a line 20 from the outside, i.e. from an inlet pipe 21 that is disposed outside of the room in which the boiler is disposed. The outer wall of the boiler room is designated by the reference numeral 23.

In order to eliminate noxious materials in the region of the heat exchanger 5, the latter is operated in such a way that the water temperature at the outlet is approximately 75° C., whereas the intake temperature at the inlet should not drop below approximately 60° C., so that in any case condensations are avoided. In contrast, considerably lower temperatures must prevail in the condensation chamber 9. With the introduction of the fresh air into the heat exchanger 10, the fresh air is heated to about 40°-50° C. In so doing, the fresh air passes from the outlet 12 via a line 22 to the connection 4 and hence to the burner 3, with the supply of fresh air, as described, being effected via the line 20 to the inlet 11.

If the heat exchanger 10 is operated in this manner, exhaust gas temperatures of approximately 20°-30° C. result; these temperatures also enable passage into the chamber 14 and introduction of the exhaust gases into the conduit 16, which is a plastic pipe.

With the invention apparatus, only one water circulation is provided with the heat exchanger 5, the inlet 6, and the outlet 7. On the other hand, the heat exchanger 10 that is disposed at the bottom in the condensation chamber 9 is operated exclusively with the supply air for the burner 3. This supply air is advantageously preliminarily heated in order in this way to improve the efficiency of the combustion.

Figure 2:
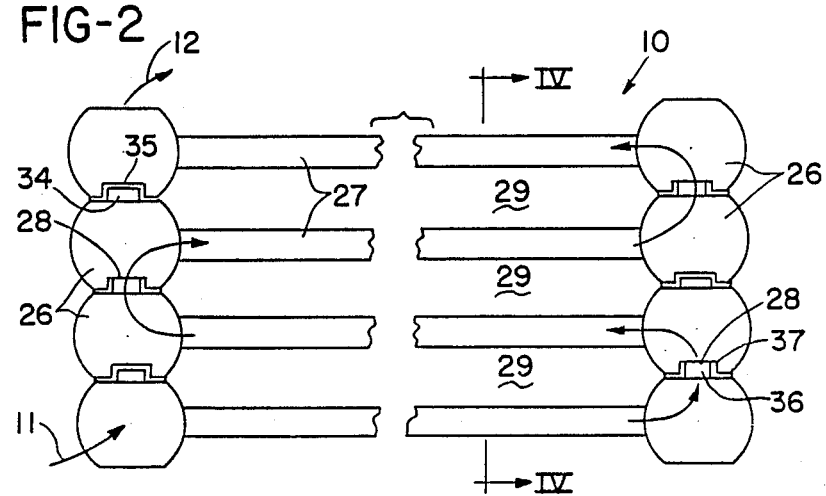
FIG. 2 is a cross-sectional view of another inventive embodiment of a heat exchanger for a hot-water boiler.
Figure 3:
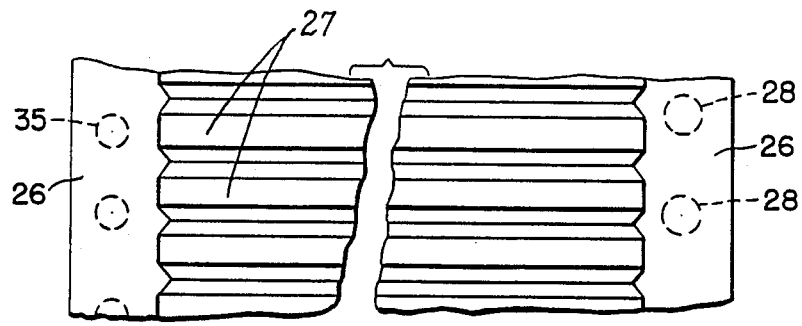
FIG. 3 is a partial plan view of the heat exchanger of FIG. 2.
Figure 4:
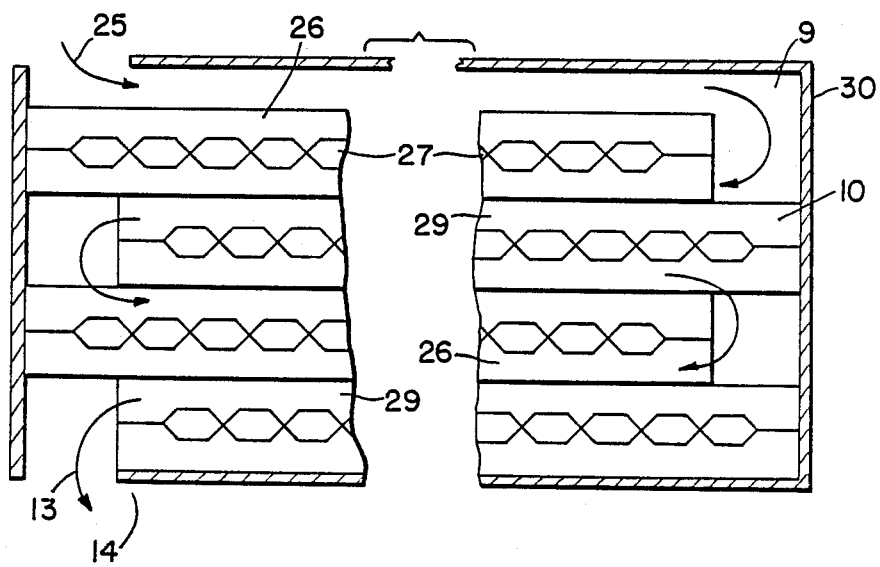
FIG. 4 is a longitudinal cross-sectional view through the heat exchanger of FIG. 2.
Figure 5:
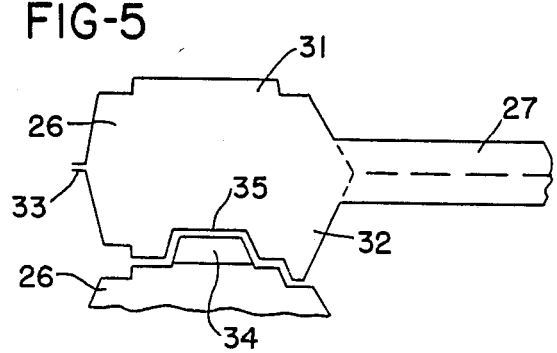
FIG. 5 is an enlarged partial cross-sectional view through the heat exchanger of FIG. 2.

In the embodiment illustrated in FIGS. 2-4, the condensation chamber is also designated by the reference numeral 9. The heat exchanger 10, which is disposed all the way at the bottom of the apparatus, has an inlet 11 for the fresh air. The preliminarily heated air, which is to be supplied to the burner, leaves the heat exchanger 10 via the outlet 12. From there, a non-illustrated line leads to the burner. Also not illustrated is the supply line to the inlet 11.

The combustion or exhaust gases are supplied to the heat exchanger 10 in the direction of the arrow 25, and these gases leave the heat exchanger 10 in the direction of the arrow at the outlet 13. From there, the exhaust gases are conveyed to a chamber 14 in which the decontamination takes place.

The outside air, which is introduced via the inlet 11, has a temperature in a range of approximately +20° to −20° C., and is preheated in the heat exchanger 10 to approximately 55° C., the exhaust gases enter the heat exchanger at a temperature of approximately 60°-75° C., and leave the heat exchanger at a temperature in a range of approximately 20°-40° C.

The heat exchanger 10 of this embodiment essentially comprises longitudinally extending channels 26 that are disposed on both sides, and are disposed one upon the other without a space between them. Those longitudinal channels 26 disposed in a given plane are interconnected via a plurality of transversely extending channels 27. In order to be able to convey fresh air back and forth in the transverse channels 27, which are disposed one above the other, the longitudinal channels 26 are alternately connected on opposite sides via openings 28 that are distributed over the length of the longitudinal channels 26.

The exhaust gases are also conveyed back and and forth, and in particular are conveyed in channels 29 that extend parallel to the longitudinal channels 26. At the top and bottom, a given channel 29 is delimited by the transverse channels 27, which are disposed one after the other without being joined; the channels 29 are delimited to both sides by the longitudinal channels 26. The remaining delimiting walls can be formed by the walls 30 of the apparatus.

The channels 26, 27 are formed by joined-together sections 31, 32, e.g. deep-drawn sections, the edges or rims of which are welded together at 33. Longitudinal channels 26 disposed above one another positively engage one another via a longitudinally extending profiling. In addition, projections 34 are distributed over the length of the channels, and engage in corresponding recesses 35 of the adjacent channel. This positive connection is provided on those sides of the longitudinal channels that do not communicate with one another. In contrast, in the region of the openings 28, one of the longitudinal channels 26 is provided with a short connecting piece 36 that extends into a tubular piece 37 of the other adjacent longitudinal channel 26. In addition, if desired, a sealing effect can also be achieved by using an adhesive. It should also be noted that a large number of the openings 28 are provided, but that only a few positive connections in the form of the projections 34 and the recesses 35 are needed.

The entire heat exchanger 10 advantageously comprises a temperature resistant foil or thin plate of plastic which, as mentioned, can be deep-drawn in order to provide the aforementioned channels 26, 27. It is possible to use plastic because the prevailing temperatures are relatively low. The walls can be fairly thin, for example approximately 0.25-0.45 mm, and generally below 0.5 mm. The rigidity of the shape of the overall structure is assured by the profiling of all of the parts.

The present invention is, of course, in no way restricted to the specific disclosure of the specification and drawings, but also encompasses any modifications within the scope of the appended claims.

What I claim is:

1. An apparatus for heating water, comprising in combination:

a housing forming a combustion chamber, a baffle means located in the combustion chamber for dividing the chamber into an upper first chamber portion and a lower second chamber portion, said first and lower second chamber portions being in fluid communication with one another, said upper first chamber portion receiving hot exhaust gases from a burner; said housing also including therebelow means in the form of a condensation chamber that receives condensate from said second chamber portion and that has decontamination occurring therein as well as having a drainage means for said condensate that discharges and drains from said condensation chamber;

first heat exchanger means associated with said first chamber portion; said first heat exchanger means having only one inlet means and only one outlet means for water that is to be heated by said hot exhaust gases during operation with only a single circulation; and second heat exchanger means disposed above said condensation chamber in said lower second chamber and adapted to heat air for combustion received at an inlet thereto as well as to pass exhaust gases therethrough that flow as combustion chamber gas through both said first heat exchanger means and said second heat exchanger means from said first chamber portion; fresh air being heated in said second heat exchanger means via the exhaust gases to a predetermined temperature range to be supplied to said burner; said combustion gases are cooled off to reach said second heat exchanger means in a range of 60°–75° C.; said second heat exchanger means having outlet means in communication with said burner for supplying heated air thereto, said second heat exchanger being made of a thin sheet of a synthetic plastic material having a wall thickness of less than 0.5 mm due to the cooled-off temperature range of said combustion gases thereto; condensation occurs in said condensation chamber for the decontamination and removal of contaminants and damaging materials therein which are discharged and drained with said condensate from said condensation chamber.

2. An apparatus in combination according to claim 1, in which air for said burner is exclusively heated air from said second heat exchanger means.

3. An apparatus in combination according to claim 1, in which said apparatus is disposed in a room having an outer wall; and in which said inlet of said second heat exchanger means communicates with a feed line that passes through said outer wall.

4. An apparatus in combination according to claim 1, in which said fresh air is heated in said second heat exchanger means to a temperature in the range of about 40°–50° C.

5. An apparatus in combination according to claim 1, in which said plastic material has a thickness of 0.25–0.45 mm.

6. An apparatus in combination according to claim 1, in which two opposite sides of said second heat exchanger means are each provided with a plurality of longitudinal channels for receiving said fresh air from said inlet and conveying it to said outlet means; the longitudinal channels on a given side of said second heat exchanger means are disposed one above the other, with a given longitudinal channel on one side communicating with a given longitudinal channel on the opposite side via a plurality of transverse channels; superimposed longitudinal channels alternately communicate with one another first on one side and then on the opposite side via openings; transverse channels that connect two longitudinal channels on opposite sides are disposed above other transverse channels that connect other longitudinal channels, with said exhaust gases from said first chamber portion being passed back and forth, in the direction of said longitudinal channels, between said superimposed transverse channels.

7. An apparatus in combination according to claim 6, in which superimposed ones of said transverse channels are not connected to one another.

8. An apparatus in combination according to claim 6, in which adjacent ones of said transverse channels, i.e. ones connecting the same two longitudinal channels, are not connected to one another.

9. An apparatus in combination according to claim 6, in which said longitudinal channels and said transverse channels are each respectively composed of two similar sections having interconnected rims.

10. An apparatus in combination according to claim 6, in which communication between longitudinal channels via said openings is effected via a plurality of tubular connecting pieces that are distributed over the length of a given longitudinal channel, and via a plurality of corresponding tubular pieces distributed over the length of an adjacent longitudinal channel, with a given connecting piece extending into a given tubular piece.

11. An apparatus in combination according to claim 6, in which superimposed longitudinal channels positively engage one another.

12. An apparatus in combination according to claim 11, in which a given longitudinal channel is provided with projections distributed over the length thereof, with an adjacent longitudinal channel being provided with recesses for receiving said projections and effecting said positive engagement.

13. An apparatus in combination according to claim 11, in which facing walls of adjacent longitudinal channels are provided with longitudinally extending profiles that extend into one another to effect said positive engagement.

* * * * *